US008620875B2

(12) United States Patent
Jagota

(10) Patent No.: US 8,620,875 B2
(45) Date of Patent: Dec. 31, 2013

(54) FRAUD ANALYSIS IN A CONTACT DATABASE

(75) Inventor: Arun Kumar Jagota, Sunnyvale, CA (US)

(73) Assignee: salesforce.com, inc., San Francisco, CA (US)

(*) Notice: Subject to any disclaimer, the term of this patent is extended or adjusted under 35 U.S.C. 154(b) by 157 days.

(21) Appl. No.: 13/357,523

(22) Filed: Jan. 24, 2012

(65) Prior Publication Data

US 2013/0031061 A1 Jan. 31, 2013

Related U.S. Application Data

(60) Provisional application No. 61/511,394, filed on Jul. 25, 2011.

(51) Int. Cl.
G06F 7/00 (2006.01)
(52) U.S. Cl.
USPC .......................................................... 707/690
(58) Field of Classification Search
USPC .................... 706/47; 705/35, 44; 707/690
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |

(Continued)

Primary Examiner — Jean M Corrielus
(74) Attorney, Agent, or Firm — Dergosits & Noah LLP; Todd A. Noah

(57) ABSTRACT

A system and method of identifying fraudulent data in a contact database is disclosed herein. In some embodiments, a set of contact records is received where each of the contact records includes a set of contact field values corresponding to a set of contact fields. Some embodiments determine whether a similar content pattern exists in the contact records using at least one of the set of contact field values. In some embodiments, a determination is made as to whether an unusual content pattern exists in the contact records using at least one of the set of contact field values. The set of contact records is flagged when at least one of the similar content pattern or the unusual content pattern is determined to exist in the contact records.

17 Claims, 8 Drawing Sheets

(56) References Cited

U.S. PATENT DOCUMENTS

| | | |
|---|---|---|
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,620,655 B2 | 11/2009 | Larsson |
| 7,698,160 B2 | 4/2010 | Beaven et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,275,836 B2 | 9/2012 | Beaven et al. |
| 8,332,230 B2 * | 12/2012 | Ryan, Jr. .......... 705/1.1 |
| 8,374,986 B2 * | 2/2013 | Indeck et al. .......... 706/47 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0097320 A1 * | 5/2003 | Gordon .......... 705/35 |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0287628 A1 * | 11/2009 | Indeck et al. .......... 706/47 |
| 2012/0101881 A1 * | 4/2012 | Taylor et al. .......... 705/14.13 |
| 2012/0259649 A1 * | 10/2012 | Mallon et al. .......... 705/2 |
| 2013/0018791 A1 * | 1/2013 | Mendicino et al. .......... 705/44 |

* cited by examiner

FRAUD ANALYSIS IN A CONTACT DATABASE

CROSS-REFERENCES TO RELATED APPLICATIONS

The present application claims the benefit under 35 U.S.C. §119(e) of U.S. Provisional Application Ser. No. 61/511,394, filed on Jul. 25, 2011, entitled "Method for Performing Fraud Analysis in a Contact Database," the content of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present generally relates to database systems, and more particularly to analyzing incoming data to detect fraudulent, bogus information submitted by a user. As an increasing amount of information is being stored and shared electronically, and as electronic information accessible through a network connection is increasingly being relied upon, there is an ever-increasing need to ensure that the information submitted by a user is not fraudulent. This includes verifying whether the information submitted by a user had been falsely created by a person or a computer. Designated persons may verify whether the information is bogus or falsified information by recognizing certain patterns throughout the information. However, it can be cumbersome to have designated persons to examine every data submission to check for fraudulent or bogus information. There is therefore a need for improved systems and methods that overcome the above problems and that facilitate the identification of fraudulent data.

The subject matter discussed in the background section may not be assumed to be prior art merely as a result of its mention in the background section. Similarly, a problem mentioned in the background section or associated with the subject matter of the background section may not be assumed to have been previously recognized in the prior art. The subject matter in the background section merely represents different approaches, which in and of themselves may also be inventions.

SUMMARY

The present invention relates generally to fraud analysis in a database system, and more particularly to implementing systems and methods for performing fraud analysis in a contact database. The techniques are applicable for use in an on-demand database and/or application services or any environment(s) in which electronic data is shared and/or exchanged. In various embodiments, methods for practicing techniques of the present invention, systems having elements or components configured to implement techniques of the present invention, devices, and computer-readable storage media storing executable code and/or instructions are disclosed.

According to one aspect of the present invention, a computer-implemented method is provided for identifying fraudulent data in a contact database. The method typically includes receiving a set of contact records, each of the set of contact records including a set of contact field values corresponding to a set of contact fields. The method also includes determining whether a similar content pattern exists in the set of contact records using at least one of the set of contact field values. The method further includes determining whether an unusual content pattern exists in the set of contact records using at least one of the set of contact field values. The method further typically includes flagging the plurality of contact records when at least one of the similar content pattern or the unusual content pattern is determined to exist in the plurality of contact records.

In certain aspects where the method determines whether the similar content pattern exists in the set of contact records includes receiving a threshold value for the similar content pattern, calculating a dupes-score for at least one of the set of contact fields, the dupes-score indicating an amount of content duplication in the at least one of the set of contact fields, and determining that the similar content pattern exists when the average dupes-score for the at least one of the set of contacts exceeds the threshold value for the similar content pattern. In certain aspects the method for calculating the dupes-score for at least one of the set of contact fields includes using one or more corresponding contact field values from a subset of the plurality of contact records.

In certain aspects the method for determining whether the unusual content pattern exists in the set of contact records includes receiving a threshold value for the unusual content pattern associated with a particular contact field, calculating an unusualness score for each of the set of contact records, the unusualness score indicating how unlikely a contact field value corresponding to the particular contact field belongs to the particular contact field, determining an overall unusualness score for the unusual content pattern by averaging the calculated unusualness score for the set of contact records, and determining that the unusual content pattern exists when the overall unusualness score exceeds the threshold value for the unusual content pattern.

In certain aspects, the unusualness score for a contact record is calculated by scoring the contact field using a field-specific scoring function. The field-specific scoring function can be trained from a training set that includes a set of known good and bad values of that field and their associated confidence level. Typically, the good values would be associated with a high confidence level while the bad values would be associated with a low confidence level. In certain aspects, at least one of the set of contact fields includes at least one of a first name field, a last name field, a title field or an e-mail address field, wherein determining whether the similar content pattern exists in the set of contact records comprises determining whether near-identical contact field values appear in the set of contact records beyond a threshold frequency.

In certain aspects, at least one of the set of contact fields includes at least one of a first name field, a last name field, or a title field, wherein determining whether the unusual content pattern exists in the set of contact records comprises determining whether seemingly unlikely contact field values appear in corresponding contact fields beyond a threshold frequency. In certain aspects, at least one of the set of contact fields includes an e-mail field, wherein determining whether the unusual content pattern exists in the set of contact records comprises determining whether an e-mail field value for each of the set of contact records is syntactically well-formed. In certain aspects, the set of records is provided to an administrator to verify whether the set of records contains fraudulent data upon the set of records being flagged.

Other embodiments of the invention are directed to systems and computer readable media associated with methods described herein.

While the present invention is described with reference to an embodiment in which techniques for matching and integrating data in an on-demand enterprise services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

I. General Overview

Figure 1:
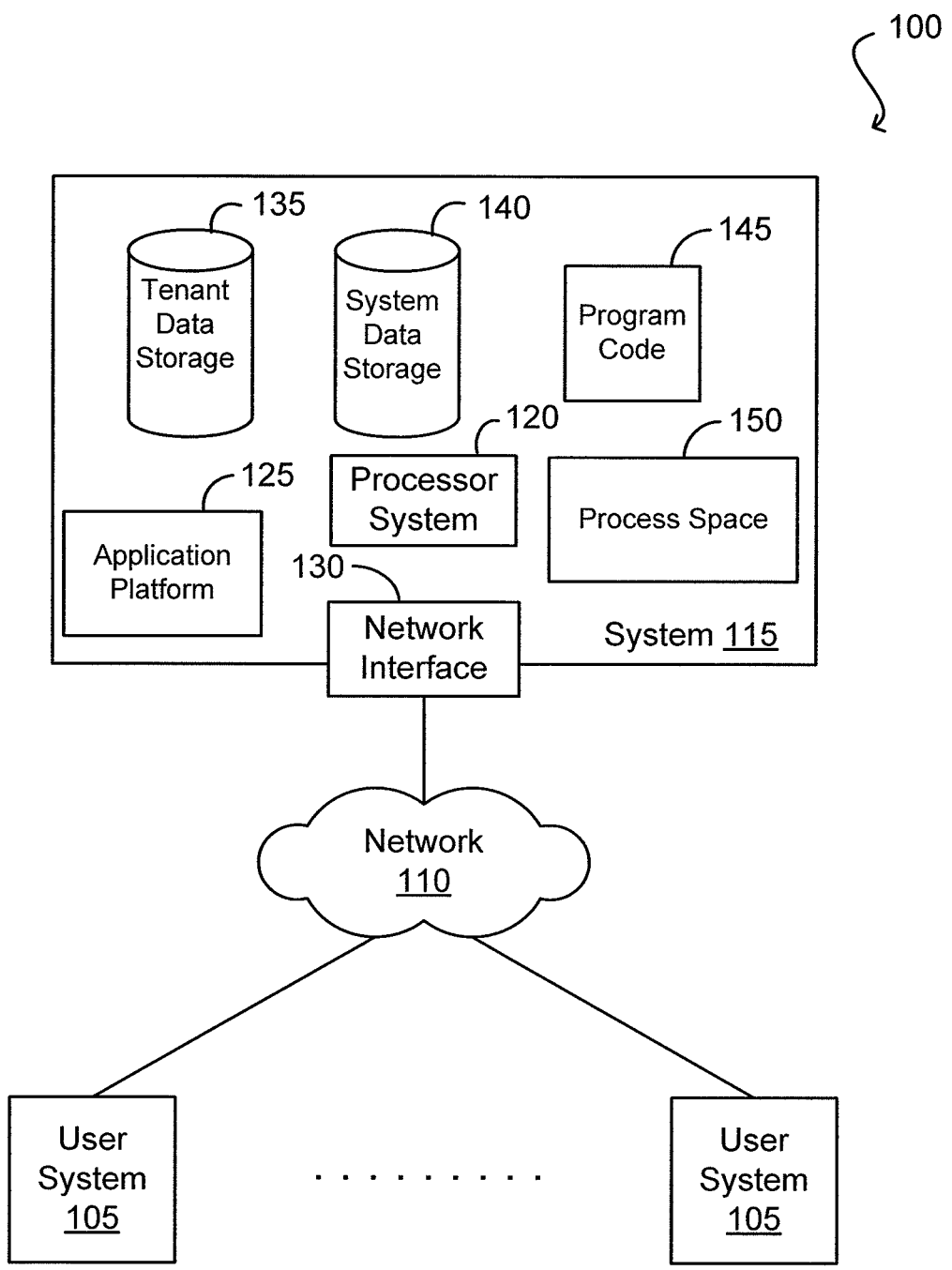
FIG. 1 illustrates a block diagram of an environment wherein an on-demand database service might be used.

Systems and methods in accordance with various embodiments of the present disclosure may overcome one or more of the aforementioned and other deficiencies experienced in conventional approaches to managing information in an electronic environment. In particular, systems and methods in accordance with various embodiments manage incoming information by performing fraudulent analysis on the incoming information prior to incorporating the incoming information into a contacts database. A contacts database is a database that contains contact records where each contact record corresponds to an individual. A contact record for a person in some embodiments includes various information about the person. In some embodiments, the contact record resembles an electronic business card where information about the person that may be included in a business card, such as the person's first and last name, title, email, phone number, and various related information is provided.

In some embodiments, incoming information may be a data submission from a user. For example, company personnel may submit contact records on behalf of the employees of the company (e.g., as a bulk file upload to the database system). Prior to incorporating the submitted records into the database system, a fraud analysis system of some embodiments may use a fraud checker to determine whether the submitted records contain bogus or fraudulent data. In some embodiments, the fraud checker may assume that the incoming information has standardized columns (i.e., each column corresponds to each of the business card attributes such as first name, last name, title, email, etc.). In some embodiments, a column mapper organizes the incoming information into standardized form prior to the fraud checker performing the fraud analysis on the incoming information. The fraud checker may perform fraud analysis on the standardized form of the incoming information to determine whether at least a portion of the incoming information is highly likely to be bogus data.

In the event that the fraud checker determines that the incoming information is highly likely to be bogus data, the fraud checker may flag the incoming information and alert an administrator in some embodiments. The administrator can then perform further analysis on the incoming data as a final arbiter on deciding whether the incoming information is fraudulent data. By having the fraud checker perform the first level of analysis, the number of files that the security administrator or the person in charge of monitoring fraudulent information would be greatly reduced such that the necessary manpower for maintaining the quality of the contacts database may be greatly reduced as well.

In some embodiments, the fraud checker determines whether an incoming file contains bogus information by detecting one or more "bogus data" patterns in the records in the file. As discussed, the incoming file may include a number of contact records, each contact record including various contact information for a particular person. In some embodiments, the fraud checker may detect one or more "bogus data" patterns or potentially fraudulent information by determining that a file contains "too much similar content" and/or "too much unusual content."

In some embodiments, the fraud checker may determine that the file contains "too much similar content" and flag the file as potentially including fraudulent data. The fraud checker may perform this determination by analyzing one or more fields or business card attributes for each record in the file (e.g., first names, email addresses) to determine whether similar or identical field values (e.g., the same names, similar email addresses) appear beyond a threshold frequency.

In some embodiments, the fraud checker may determine that the file contains "too many unusual values" and flag the file. The fraud checker may perform this determination by analyzing one or more fields or business card attributes (e.g., the name field) to determine whether there are too many gibberish values (e.g., strings that do not appear to be normal names) in one or more fields. The fraud checker may determine that the file contains "too many unusual values" when the frequency of gibberish person names have been identified as exceeding a threshold amount or percentage, when more than a threshold number of titles have been identified as unknown or non-existent, when there are more than a threshold number of "near-identical" contact emails (e.g., john@xyz.com, john2@xyz.com, john3@xyz.com, etc.), when there are beyond a threshold number of occurrences of the same or similar contact name, or when there are more than a threshold number of C-level contacts out of the entire file, etc.

II. System Overview

In certain embodiments, the fraud analysis methods and systems are implemented in a multi-tenant database system or service. As used herein, the term multi-tenant database system refers to those systems in which various elements of hardware and software of the database system may be shared by one or more customers. For example, a given application server (e.g. running an application process) may simultaneously process requests for a great number of customers, and a given database table may store rows for a potentially much greater number of customers. As used herein, the terms query or query plan refer to a set of steps used to access information in a database system.

FIG. 1 illustrates a block diagram of an environment 100 wherein an on-demand database service might be used. Environment 100 may include user systems 105, network 110, and system 115, which may comprise processor system 120, application platform 125, network interface 130, tenant data storage 135, system data storage 140, program code 145, and process space 150. In other embodiments, environment 100 may not have all of the components listed and/or may have other elements instead of, or in addition to, those listed above.

Environment 100 is an environment in which an on-demand database service exists. User system 105 may be any machine or system that is used by a user to access a database user system. For example, any of user systems 105 can be a handheld computing device, a mobile phone, a laptop computer, a work station, and/or a network of computing devices. As illustrated in FIG. 1 (and in more detail in FIG. 2) user systems 105 might interact via a network 110 with an on-demand database service, which is system 115.

An on-demand database service, such as system 115, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 115" and "system 115" will be used interchangeably herein. A database image may include one or more database objects. A relational database management system (RDBMS) or the equivalent may execute storage and retrieval of information against the database object(s). Application platform 125 may be a framework that allows the applications of system 115 to run, such as the hardware and/or software, e.g., the operating system. In an embodiment, on-demand database service 115 may include an application platform 125 that enables creation, managing and executing one or more applications developed by the provider of the on-demand database service, users accessing the on-demand database service via user systems 105, or third party application developers accessing the on-demand database service via user systems 105.

The users of user systems 105 may differ in their respective capacities, and the capacity of a particular user system 105 might be entirely determined by permissions (permission levels) for the current user. For example, where a salesperson is using a particular user system 105 to interact with system 115, that user system has the capacities allotted to that salesperson. However, while an administrator is using that user system to interact with system 115, that user system has the capacities allotted to that administrator. In systems with a hierarchical role model, users at one permission level (profile type) may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 110 is any network or combination of networks of devices that communicate with one another. For example, network 110 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it may be understood that the networks that the present invention might use are not so limited, although TCP/IP is a frequently implemented protocol.

User systems 105 might communicate with system 115 using TCP/IP and, at a higher network level, use other common Internet protocols to communicate, such as HTTP, FTP, AFS, WAP, etc. In an example where HTTP is used, user system 105 might include an HTTP client commonly referred to as a "browser" for sending and receiving HTTP messages to and from an HTTP server at system 115. Such an HTTP server might be implemented as the sole network interface between system 115 and network 110, but other techniques might be used as well or instead. In some implementations, the interface between system 115 and network 110 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 115, shown in FIG. 1, implements a web-based customer relationship management (CRM) system. For example, in one embodiment, system 115 includes application servers configured to implement and execute CRM software applications as well as provide related data, code, forms, webpages and other information to and from user systems 105 and to store to, and retrieve from, a database system related data, objects, and webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 115 implements applications other than, or in addition to, a CRM application. For example, system 115 may provide tenant access to multiple hosted (standard and custom) applications, including a CRM application. User (or third party developer) applications, which may or may not include CRM, may be supported by the application platform 125, which manages creation, storage of the applications into one or more database objects and executing of the applications in a virtual machine in the process space of the system 115.

One arrangement for elements of system 115 is shown in FIG. 1, including a network interface 130, application platform 125, tenant data storage 135 for tenant data, system data storage 140 for system data accessible to system 115 and possibly multiple tenants, program code 145 for implementing various functions of system 115, and a process space 150 for executing MTS system processes and tenant-specific processes, such as running applications as part of an application hosting service. Additional processes that may execute on system 115 include database indexing processes.

Several elements in the system shown in FIG. 1 include conventional, well-known elements that are explained only briefly here. For example, each user system 105 could include a desktop personal computer, workstation, laptop, PDA, cell phone, or any wireless access protocol (WAP) enabled device or any other computing device capable of interfacing directly or indirectly to the Internet or other network connection. User system 105 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 105 to access, process and view information, pages and applications available to it from system 115 over network 110. Each user system 105 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 115 or other systems or servers. For example, the user interface device can be used to access data and applications hosted by system 115, and to perform searches on stored data, and otherwise allow a user to interact with various GUI pages that may be presented to a user. As discussed above, embodiments are suitable for use with the Internet, which refers to a specific global internetwork of networks. However, it may be understood that other networks can be used instead of the Internet, such as an intranet, an extranet, a virtual private network (VPN), a non-TCP/IP based network, any LAN or WAN or the like.

According to one embodiment, each user system 105 and all of its components are operator configurable using applications, such as a browser, including computer code run using a central processing unit such as an Intel Pentium® processor or the like. Similarly, system 115 (and additional instances of an MTS, where more than one is present) and all of their components might be operator configurable using application (s) including computer code to run using a central processing unit such as processor system 120, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 115 is configured to provide webpages, forms, applications, data and media content to user (client) systems 105 to support the access by user systems 105 as tenants of system 115. As such, system 115 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It may also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
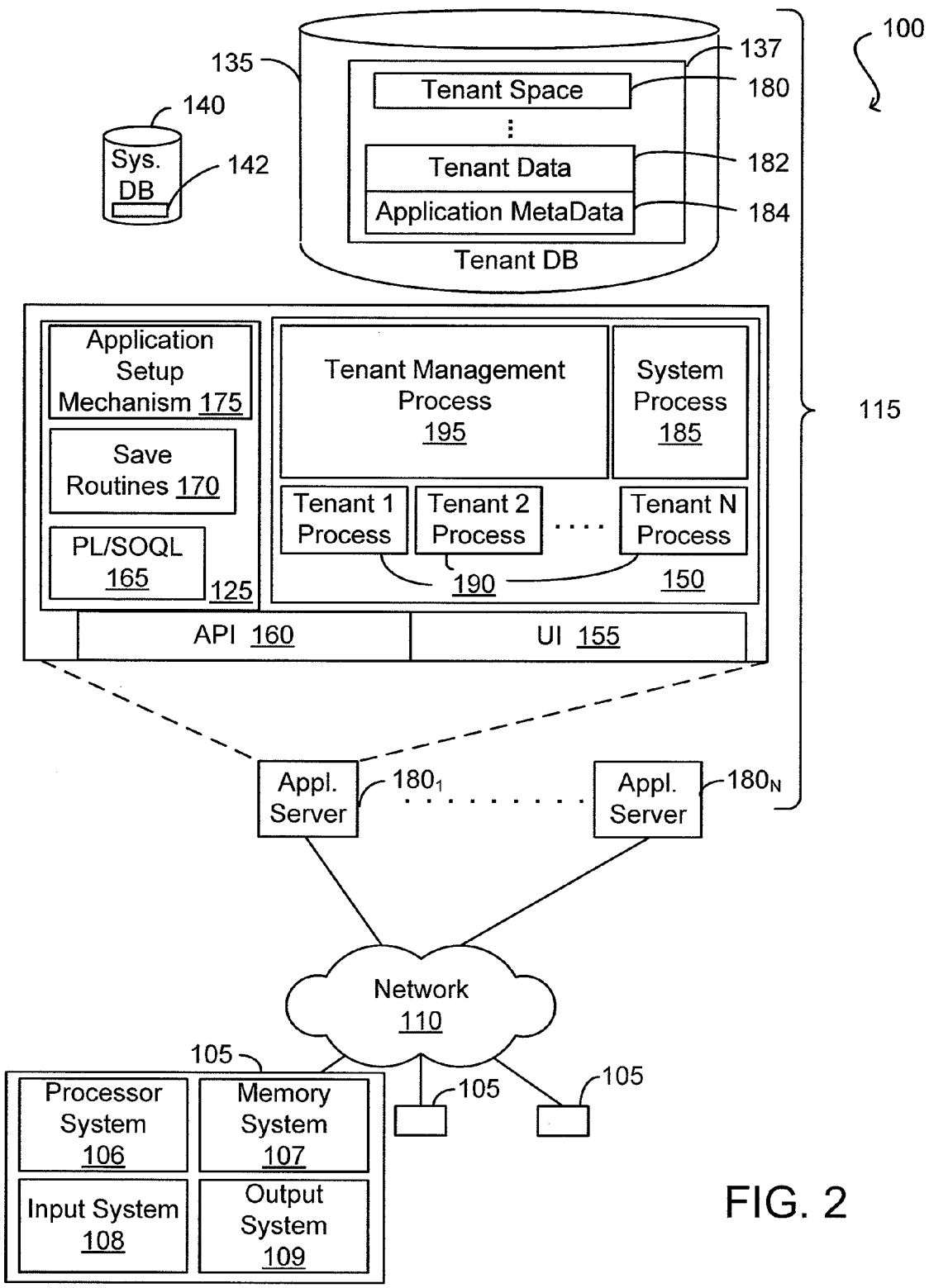
FIG. 2 illustrates a block diagram of an embodiment of elements of FIG. 1 and various possible interconnections between these elements according to an embodiment of the present invention.

FIG. 2 also illustrates environment 100. However, in FIG. 2 elements of system 115 and various interconnections in an embodiment are further illustrated. FIG. 2 shows that user system 105 may include processor system 106, memory system 108, input system 108, and output system 109. FIG. 2 shows network 110 and system 115. FIG. 2 also shows that system 115 may include tenant data storage 135, tenant data 137, system data storage 140 system data 142, User Interface (UI) 155, Application Program Interface (API) 160, PL/SOQL 165, save routines 170, application setup mechanism 175, applications servers $180_1$-$180_N$, system process space 185, tenant process spaces 190, tenant management process space 195, tenant storage area, user storage, and application metadata. In other embodiments, environment 100 may not have the same elements as those listed above and/or may have other elements instead of, or in addition to, those listed above.

User system 105, network 110, system 115, tenant data storage 135, and system data storage 140 were discussed above in FIG. 1. Regarding user system 105, processor system 106 may be any combination of one or more processors. Memory system 107 may be any combination of one or more memory devices, short term, and/or long term memory. Input system 108 may be any combination of input devices, such as one or more keyboards, mice, trackballs, scanners, cameras, and/or interfaces to networks. Output system 109 may be any combination of output devices, such as one or more monitors, printers, and/or interfaces to networks. As shown by FIG. 2, system 115 may include a network interface 110 (of FIG. 1) implemented as a set of HTTP application servers 180, an application platform 125, tenant data storage 135, and system data storage 140. Also shown is system process space 185, including individual tenant process spaces 190 and a tenant management process space 195. Each application server 180 may be configured to tenant data storage 135 and the tenant data 137 therein, and system data storage 140 and the system data 142 therein to serve requests of user systems 105. The tenant data 137 might be divided into individual tenant storage areas 180, which can be either a physical arrangement and/or a logical arrangement of data. Within each tenant storage area 180, user storage 182 and application metadata 184 might be similarly allocated for each user. For example, a copy of a user's most recently used (MRU) items might be stored to user storage 182. Similarly, a copy of MRU items for an entire organization that is a tenant might be stored to tenant storage area 180. A UI 155 provides a user interface and an API 160 provides an application programmer interface to system 115 resident processes to users and/or developers at user systems 105. The tenant data and the system data may be stored in various databases, such as one or more Oracle™ databases.

Application platform 125 includes an application setup mechanism 175 that supports application developers' creation and management of applications, which may be saved as metadata into tenant data storage 135 by save routines 170 for execution by subscribers as one or more tenant process spaces 190 managed by tenant management process 195 for example. Invocations to such applications may be coded using PL/SOQL 165 that provides a programming language style interface extension to API 160. A detailed description of some PL/SOQL language embodiments is discussed in commonly owned U.S. Pat. No. 7,730,478, entitled "METHOD AND SYSTEM FOR ALLOWING ACCESS TO DEVELOPED APPLICATIONS VIA A MULTI-TENANT ON-DEMAND DATABASE SERVICE," issued Jun. 1, 2010 to Craig Weissman, and hereby incorporated in its entirety herein for all purposes. Invocations to applications may be detected by one or more system processes, which manages retrieving application metadata 184 for the subscriber making the invocation and executing the metadata as an application in a virtual machine.

Each application server 180 may be communicably coupled to database systems, e.g., having access to system data 142 and tenant data 137, via a different network connection. For example, one application server $180_1$ might be coupled via the network 110 (e.g., the Internet), another application server $180_{N-1}$ might be coupled via a direct network link, and another application server $180_N$ might be coupled by yet a different network connection. Transfer Control Protocol and Internet Protocol (TCP/IP) are typical protocols for communicating between application servers 180 and the database system. However, it will be apparent to one skilled in the art that other transport protocols may be used to optimize the system depending on the network interconnect used.

In certain embodiments, each application server 180 is configured to handle requests for any user associated with any organization that is a tenant. Because it is desirable to be able to add and remove application servers from the server pool at any time for any reason, there is preferably no server affinity for a user and/or organization to a specific application server 180.

In one embodiment, therefore, an interface system implementing a load balancing function (e.g., an F5 Big-IP load balancer) is communicably coupled between the application servers 180 and the user systems 105 to distribute requests to the application servers 180. In one embodiment, the load balancer uses a least connections algorithm to route user requests to the application servers 180. Other examples of load balancing algorithms, such as round robin and observed response time, also can be used. For example, in certain embodiments, three consecutive requests from the same user could hit three different application servers 180, and three requests from different users could hit the same application server 180. In this manner, system 115 is multi-tenant, wherein system 115 handles storage of, and access to, different objects, data and applications across disparate users and organizations.

As an example of storage, one tenant might be a company that employs a sales force where each salesperson uses system 115 to manage their sales process. Thus, a user might maintain contact data, leads data, customer follow-up data, performance data, goals and progress data, etc., all applicable to that user's personal sales process (e.g., in tenant data storage 135). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 115 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 115 might also maintain system level data usable by multiple tenants or other data. Such system level data might include industry reports, news, postings, and the like that are sharable among tenants.

In certain embodiments, user systems 105 (which may be client systems) communicate with application servers 180 to request and update system-level and tenant-level data from system 115 that may require sending one or more queries to tenant data storage 135 and/or system data storage 140. System 115 (e.g., an application server 180 in system 115) automatically generates one or more SQL statements (e.g., one or more SQL queries) that are designed to access the desired information. System data storage 140 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It may be understood that "table" and "object type" may be used interchangeably herein. Each table generally contains one or more data categories logically arranged as columns or fields in a viewable schema. Each row or record of a table contains an instance of data for each category (type) defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, Opportunity data, and other object types, each containing pre-defined fields. It may be understood that the word "entity" may also be used interchangeably herein with "object" and "table", when entity or object is referring to a collection of objects or entities of a particular type.

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled "CUSTOM ENTITIES AND FIELDS IN A MULTI-TENANT DATABASE SYSTEM," issued Aug. 17, 2010 to Craig Weissman, and hereby incorporated herein by reference, includes discussion on systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

III. Fraud Analysis in a Contact Database

Figure 3:
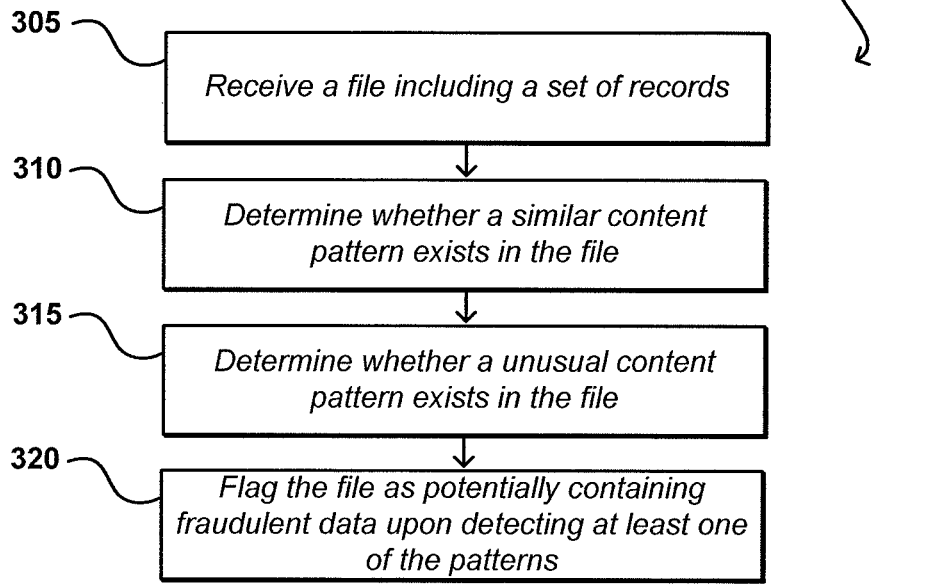
FIG. 3 illustrates an example of a process for determining whether a file contains fraudulent data upon a contacts database receiving the file in accordance with some embodiments

FIG. 3 illustrates an example of a process 300 for determining whether a file contains fraudulent data upon a contacts database receiving the file in accordance with some embodiments. It should be understood, however, that for any process described herein there can be additional, fewer, or alternative steps performed in similar or alternative orders, or in parallel, unless otherwise stated, within the scope of the various embodiments. Some or all of the process 300 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In this example process 300 illustrated in FIG. 3, a file containing a set of contact records is received 305. Each of the set of contact records may correspond to a person (e.g., in a company, in an organization). In some embodiments, each of the set of contact records includes one or more field values for one or more fields (e.g., first name field, last name field, title field, email field, home phone field, etc.). A determination is made as to whether a "similar content" pattern exists in the file 310. A "similar content" pattern is one where the same or equivalent information appears throughout the file at a frequency exceeding a designated threshold for that pattern. For instance, a "similar content" pattern can be found when the same first name "Athena" appears in a file at a frequency of 90%. Some embodiments may deem this detected pattern as an indicator of fraud since it is highly unlikely for a file to contain that many "Athena's" either in the same company or even within the same file.

A determination is made as to whether an "unusual content" pattern exists in the file 315. An "unusual content" pattern is identified when field values listed under one or more fields are unlikely to belong to the one or more fields. For instance, when strings of gibberish appear beyond a threshold frequency under the first name field, then the fraud checker may determine that an "unusual content" pattern exists in the file. In another instance, when digits appear in various records under the title field beyond a threshold frequency (e.g., that enables a user to reasonably conclude that the series of digits appearing under the title field are unlikely a series of typos but likely fraudulent information), then a determination that an "unusual content" pattern exists in the file may be made.

The file is flagged as potentially containing fraudulent data when at least one of a "similar content" pattern or a "unusual content" pattern is determined to exist in the file 320. Upon detecting one or more of the "bogus data" patterns in the file, the security administrator or a user may be alerted such that the administrator or the user can review the file and make a determination as to whether the file indeed contains fraudulent information. In some embodiments, further screening by a human is unnecessary. The file may be determined to contain fraudulent information upon determining that one or more "bogus data" pattern exists within the file.

Some embodiments perform a one time-run through of each record in the file or a linear pass over the entire batch of records in performing the determination as to whether any of the "bogus data" patterns exists in the file. This implementation where characteristics of the records are tracked in memory as the fraud checker runs through each record in the file once, a performance or running time of quasi-linear time is significantly faster than having to perform a record-by-record comparison (i.e., $n^2$). Further, in some instances, the number of records in the file can be in the millions, thereby requiring performance considerations. This implementation would enable an enormous amount of information to be processed in a reasonably efficient way when performing the determination as to whether the file includes fraudulent data.

Some embodiments determine whether a file contains fraudulent data by checking whether one or more patterns appear in the file while some embodiments check all the patterns or patterns in addition to those specified by an administrator. It should be noted that, for the purpose of illustration, a limited number of patterns are described in this document. However, various embodiments may identify various other "bogus data" patterns (e.g., including the "similar content" patterns and "unusual content" patterns described) that may be used by the fraud checker to determine whether fraudulent data may exist in the file. Upon determining that one or more "bogus data" patterns exists in the file, the file is flagged as containing or potentially containing fraudulent data.

Figure 4:
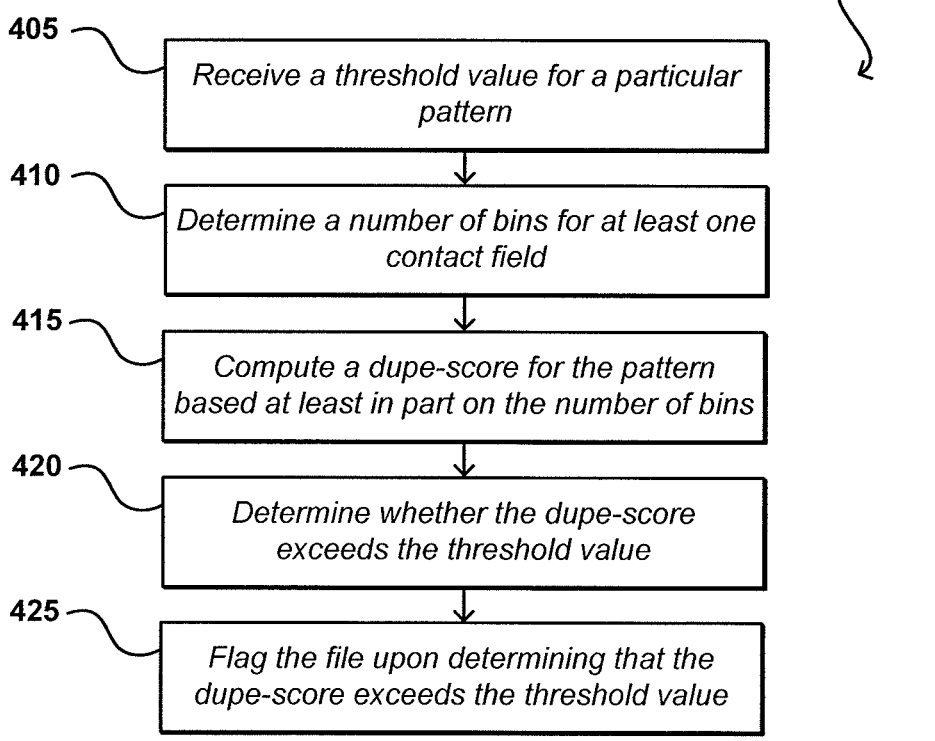
FIG. 4 illustrates an example of process for performing a determination as to whether a "similar content" pattern exists in a set of records in accordance with some embodiments.

FIG. 4 illustrates an example of process 400 for performing a determination as to whether a "similar content" pattern exists in a set of records in accordance with some embodiments. As described, a "similar content" pattern can be identified when the same or similar field values under a particular field appear beyond a threshold frequency specified for that particular field. For instance, a file may be flagged as having "too many e-mail dupes" when the same or similar e-mails appears repeatedly throughout the file at a frequency beyond a threshold specified for the e-mail field (e.g., several e-mails being repeated five times throughout the file). In some embodiments, the threshold value for the particular field (e.g., email field, title field, etc.) used to assess whether the similar content appears too often such that the data may be deemed as potentially fraudulent may be predetermined and modified by a user or an administrator (e.g., in a properties file).

In this example, a threshold value for a particular pattern is received 405. In some embodiments, the particular pattern is detected when there is repetition or duplication of a field value beyond a threshold set by a user. For instance, the threshold value set for a particular pattern such as "title dupes" or "too many similar titles" may be higher than a threshold value set for a particular pattern such as "e-mail dupes. Different fields have differing minimum degrees of similar content beyond which the data may be deemed as unusual, thereby requiring field-specific thresholds. For example, the repetition threshold level for the e-mail field may be set lower than the threshold level for the title field for the reason that e-mail duplications or "e-mail dupes" in a single file may be due to unintentional record-level dupes or fraud while the reason for title dupes may be due to the fact that many people can have the same title (e.g., a firm having many associates or a company having many software engineers).

A determination is made as to a number of bins for at least one field or contact field 410. In some embodiments, the number of bins indicates the number of different or distinct field values after normalization (e.g., by removing extraneous digits, by removing periods between letters). For instance, "jdoe@xyz.com" and "jdoe1@xyz.com" and "j.doe@xyz.com" would be associated with the same bin "jdoe@xyz.com" after normalization of each of the e-mail field values (i.e., by removing the digits following the letters, by removing the period between the letters). After each field value is normalized, a bin is created for each field value for which a bin has not been created before. For instance, a bin is created for "jdoe@xyz.com" the first time a normalized field value "jdoe@xyz.com" has been detected. As the fraud checker goes through each record in the received file, the fraud checker continues to normalize each field value and increase the count for each bin for which a bin has already been created or creates a new bin for a normalized field value that has not been encountered. After a linear run through a set of records in the received file, a number of bins are created for each distinct field value under each field.

In some embodiments, more than one field is considered when performing the determination as to the number of bins. Depending on the type of pattern that is being detected, such as "full name dupes" or "too many similar full names," both the first name field and the last name field may be taken into account when creating the number of bins. As the fraud checker goes through each record, the fraud checker may normalize the first and last name field values (e.g., by correcting for minor misspellings, for checking for aliases) and create bins for normalized values for which bins have not been created. In some embodiments, the fraud checker increments a count when the fraud checker encounters a normalized value for which a bin has already been created. Different types of patterns may require the fraud checker to keep track of the field values of one or more fields of a set of records in the file.

A dupe-score for the pattern is computed based at least in part on the number of bins 415. The data may be analyzed once the pass over the file is complete. The amount of duplication of a particular pattern p may be quantified by the following equation:

$$\text{dupes-score}(p) = (m-n)*100/m$$

when m>0, and the amount of duplication of a particular pattern p is 0 when m=0, where n is the number of distinct normalized values (which corresponds to the number of bins) and m is the total number of occurrences of the field values in the file. The multiplier 100 makes the outcome interpretable as a percentage (i.e., have a range between 0 and 100).

In an instance where the dupes-score on the dupes-title pattern is used, the file may contain 1000 titles where each distinct title occurs twice. In this case, m=1000, n=500, and dupes-score=50%. If, on the other hand, all of the titles are identical, then the dupes-score would be 99.9%.

A determination as to whether the dupe-score exceeds the threshold value is made 420. If the dupe-score is determined to exceed the threshold value, the file is flagged 425. In some embodiments, when the dupe-score is determined to meet or exceed the pattern threshold, then the file is flagged. The file is not flagged when the dupe-score does not exceed the threshold value. In some embodiments, the threshold value is adjustable by a user or an administrator such that the sensitivity in detecting fraudulent patterns may be adjusted. For instance, the threshold value for determining whether there are too many first name duplicates may be adjusted or increased to tolerate more first name duplicates before the file is flagged as being potentially fraudulent, especially when the file has been identified as being from a particular country where similar first names are common.

Figure 5A:
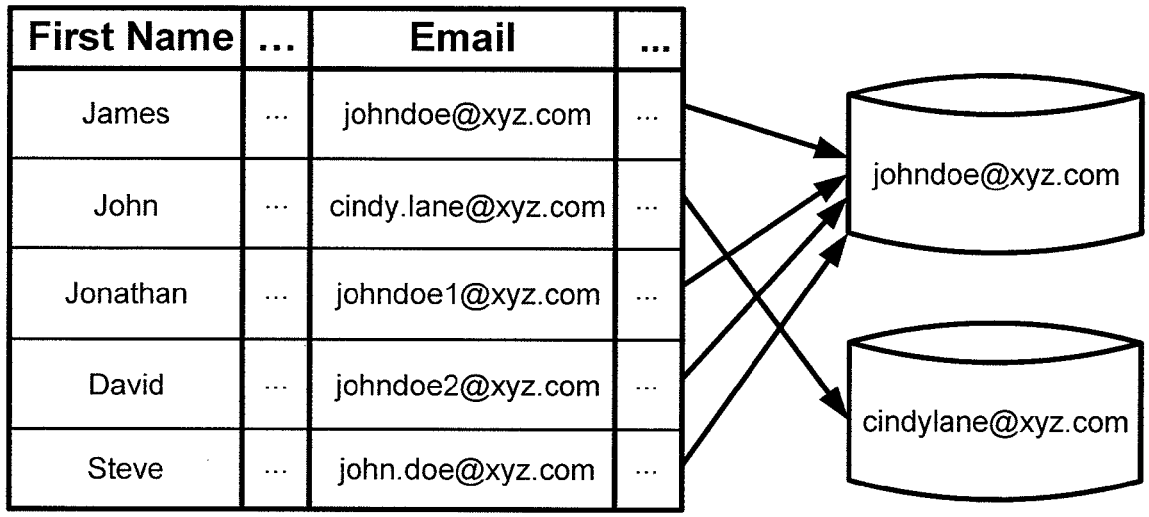
FIGS. 5(a)-5(c) illustrate examples of determining whether different sets of records contain at least one "bogus data" pattern, or more specifically, a "similar content" pattern, in accordance with one embodiment.
Figure 5B:
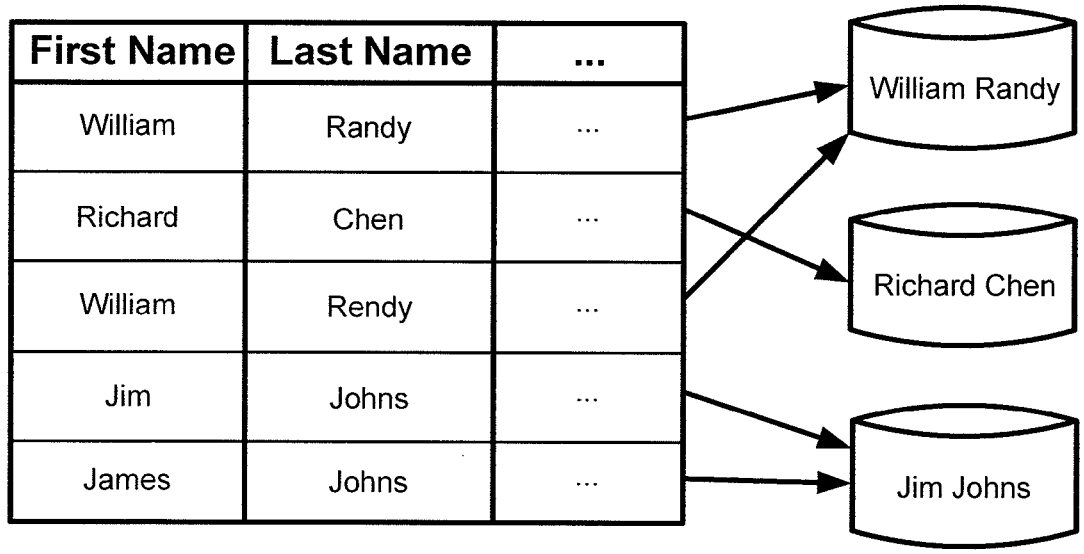
Figure 5C:
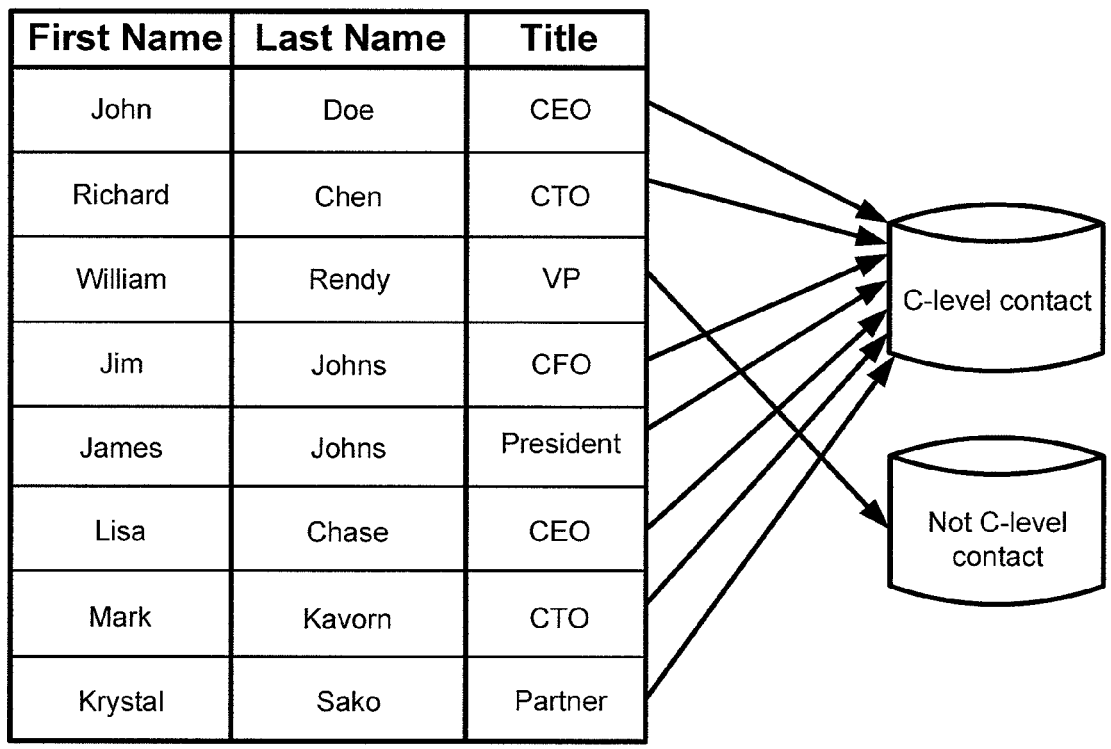

FIGS. 5(a)-5(c) illustrate examples of determining whether different sets of records contain at least one "bogus data" pattern, or more specifically, a "similar content" pattern, in accordance with one embodiment. FIG. 5(a) illustrates an example for determining whether a set of records contains an "e-mail dupe" pattern where the emails are repeated throughout the file at a frequency beyond a threshold value (e.g., predetermined by a user). As the fraud checker determines whether the "e-mail dupe" pattern exists, a bin for each distinct normalized field value is created. As shown in FIG. 5(a), a bin for "johndoe@xyz.com" is created when the fraud checker is examining the first record in the set of records. The fraud checker creates another bin "cindylane@xyz.com" when the fraud checker encounters another record having a distinct normalized field value.

As the fraud checker makes a linear pass through the set of records in the file, the fraud checker normalizes each field value and then creates another bin or identifier associated with a distinct normalized field value. In the instance where the fraud checker encounters a normalized field value for which a bin or identifier has been created, the fraud checker increases the identifier count. When the fraud checker encounters "johndoe1@xyz.com" in the third record, the fraud checker normalizes the field value (i.e., removes the digits after the letter) and determines that a previous similar field value exists. The fraud checker then determines that the field value in the third record is associated with the bin "johndoe@xyz.com" and increments an identifier count for "johndoe@xyz.com".

The fraud checker determines whether to create more bins or identifiers for the field values as the fraud checker goes through the file. As shown, the last two records in the file have normalized e-mail values that correspond to an e-mail value for which a bin was previously created. Therefore, the identifier count is incremented for "johndoe@xyz.com" as the field checker determines that the records contain a similar e-mail value. After the fraud checker runs through the entire file, the fraud checker performs post-pass analysis to compute the dupe-score for the "e-mail dupe" pattern.

In this instance, a dupe-score is calculated based at least in part on the number of bins or the number of identifiers created. Since this file contains five e-mails with one of the e-mails occurring four times, then according to the dupes-score equation for "e-mail dupe" pattern, the dupes-score is 60%. If the predetermined threshold is set at lower than 60%, then the file is flagged as potentially containing bogus data. Since people generally do not share the same e-mail addresses, it is likely that a dupes-score of 60% for "e-mail dupe" pattern would be identified as potentially containing bogus information.

While FIG. 5(a) illustrates an example for determining whether a set of records contains a particular "bogus data" pattern using field values from a single field, some embodiment enable the fraud checker to determine whether a "bogus data" pattern exists in the file by using more than a single field. FIG. 5(b) illustrates an example where multiple fields are taken into account when determining whether a multi-field "similar content" pattern exists in the file. In this example, the fraud checker determines whether a "full name dupe" pattern exists in the file.

As shown in this example, multiple fields are taken into account when determining whether a "full name dupe" pattern exists in the file. The fraud checker creates a bin or an identifier for "William Randy" when the fraud checker encounters a distinct multi-field value. The fraud checker creates another bin for "Richard Chen" when the fraud checker determines that the normalized multi-field value of the subsequent record is distinct. In some embodiments, the fraud checker determines that the normalized multi-field value is distinct when the normalized multi-field value is different from the previously encountered values in the same file.

The fraud checker may determine that the normalized multi-field value is similar or equivalent to a previously encountered multi-field value. This ensures that field values that are similar with minor variations (e.g., vowel changes or letter substitutions) are identified as having "similar content." In the third record, the fraud checker determines that "William Rendy" falls in the same bin or is similar to "William Randy" and associates the multi-field value in the third record with the bin created for "William Randy" or increases the count of an identifier associated with "William Randy."

As the fraud checker runs through each record in the file, the fraud checker of some embodiments then identifies the fourth record as including a distinct multi-field value and creates a separate bin for the distinct normalized multi-field value. When the fraud checker reaches the last record in the file, the fraud checker normalizes the multi-field value (e.g., by determining aliases, by correcting misspellings, etc.) and determines whether a similar normalized multi-value has appeared in the same file. The fraud checker determines that a similar normalized multi-value "Jim Johns" has been previously encountered and for which a bin was created. In this case, an identifier that corresponds to the previously encountered "Jim Johns" is incremented or the last record is placed into the bin for the normalized multi-value.

After the fraud checker determines, for each record in the file, whether to create a new identifier to be associated with each distinct field value or to increase a counter for an existing identifier, the fraud checker performs post-pass analysis to compute the dupe-score for the "full name dupe" pattern. Again, a dupe-score may be calculated based at least in part on the number of bins/identifiers or the number of distinct field values identified. Since this file contains five records with two of the full names occurring twice each, leaving three distinct full names, then according to the dupes-score equation, the dupes-score for "full name dupe" pattern is 40%. If the predetermined threshold is set at lower than 40%, then the file is flagged as potentially containing bogus data. While repetitive first names are fairly common, people generally do not share the same full name. Therefore, it is likely that a dupes-score of 40% for "full name dupe" pattern would be identified as potentially containing bogus information.

While some embodiments create new identifiers for each distinct field value in order to determine whether the data is sufficiently distinct without having an exceedingly large amount of repetition, some embodiments predetermine a set of bins or identifiers and determine the bin to which a field value for a record belongs. The fraud checker may then determine whether one of the set of bins or identifiers is associated with a number of records beyond a threshold frequency. FIG. 5(c) illustrates an example where a title field is used to determine whether "similar content" pattern exists in the file. In this example, the fraud checker determines whether the title field value of each record is classified as a C-level contact (e.g., chief executive officer (CEO), chief operating officer (COO), chief information officer (CIO), partner, president, etc.) or a non-C-level contact (e.g., vice president (VP), associate, manager, etc.). In some embodiments, the fraud checker determines that the file contains potentially fraudulent data when the number of C-level contacts greatly outweighs the number of non-C-level contacts or that the C-level contacts is a large percentage of those included in the file beyond a threshold percentage predetermined by a user.

Some embodiments may set a higher threshold percentage for smaller companies (e.g., fewer than five people) since smaller companies may typically have a higher percentage of C-level contacts compared to larger companies (e.g., companies with thousands of employees). In this example, seven out of eight of the contacts in the file are classified as C-level contacts by a rank classifier that can analyze and classify business or professional titles to particular ranks. If the predetermined threshold level is lower than the percentage calculated for the C-level contacts versus the non-C-level contacts in the file, then the file may be flagged as potentially containing fraudulent data.

In some embodiments, the fraud checker creates separate C-level contact and non-C-level contact bins or identifiers for contacts that belong to a different company. The enables the fraud checker to determine whether there are too many C-level contacts in a particular company, thereby indicating that fraudulent data might exist in the file.

Figure 6:
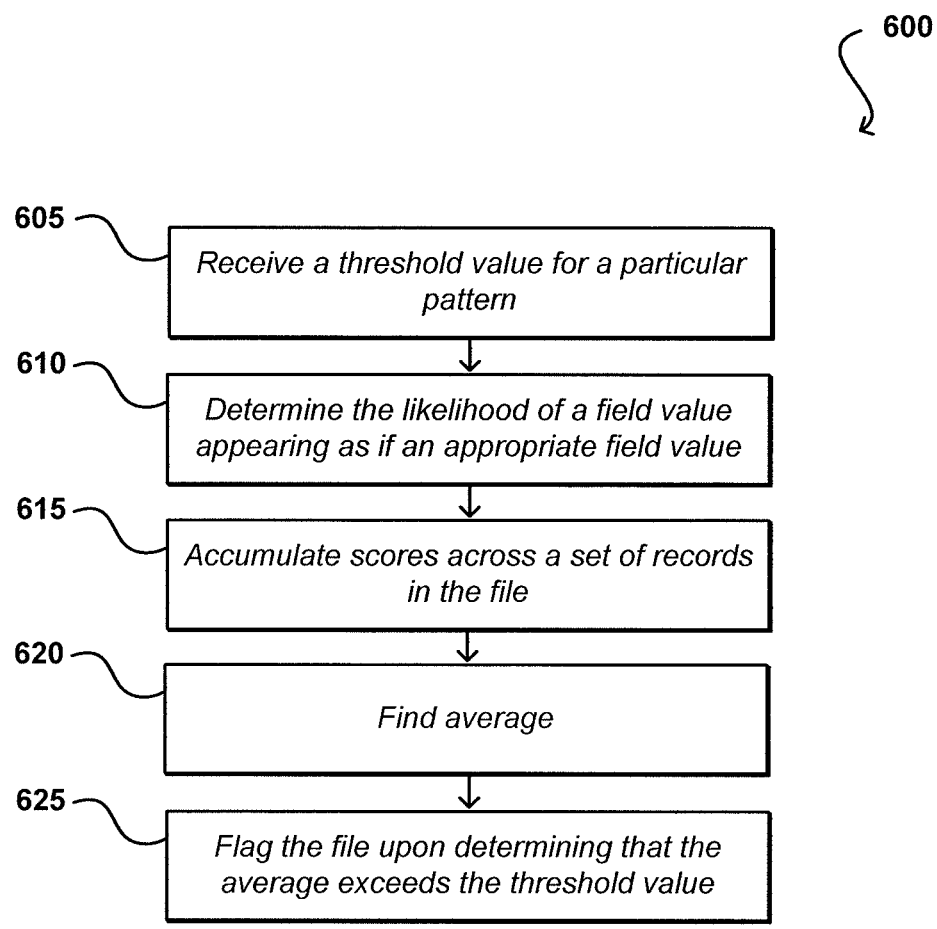
FIG. 6 illustrates an example of a process for performing a determination as to whether an "unusual content" pattern exists in a set of records in accordance with some embodiments.

FIG. 6 illustrates an example of a process 600 for performing a determination as to whether an "unusual content" pattern exists in a set of records in accordance with some embodiments. As described, an "unusual content" pattern in a set of records can be identified when field values under a particular contact field appear to be sufficiently unlike values that typically should be under the particular field appear. For instance, a file may be flagged as having "too many seemingly gibberish person names" when gibberish strings that appear unlikely to be real people's names appear throughout the file. In another instance, a file may be flagged as having "too many unknown titles" when strings that appear unlikely to be real titles appear throughout the file (e.g., phone numbers, made-up titles, etc.).

In this example, a threshold value for a particular pattern is received 605. In some embodiments, the threshold value for the particular field (e.g., name field, title field, e-mail field, etc.) is used to assess whether the content or field value is exceedingly unusual beyond a threshold or that the unusual content appears beyond a threshold frequency such that data may be deemed as potentially fraudulent. As mentioned, the threshold value may be predetermined and adjusted by a user (e.g., in a properties file). Some embodiments determine whether an "unusual content" pattern exists by assessing each of the set of field values to obtain an unusualness score for each, accumulating all the unusualness scores, taking the average, and applying a suitable threshold to determine whether the average is high enough to warrant an alert or not. This approach enables detection of subtler cases of fraudulent data where a number of data scores are moderately high for being unusual but not enough individual cases score high enough so as to trigger the count-based alert.

In some embodiments, the each pattern has one or more thresholds. A threshold may be a threshold on the unusualness score of an individual field value. In some embodiments, if a field value's unusualness score meets or exceeds this threshold, that field value is judged to be significantly unusual. For instance, a field value of "asxyrb" under the first name field will be determined to be a significantly unusual value for the first name of a person. Another threshold may be a threshold on the percentage of field values for this pattern in the file that are significantly unusual. In some embodiments, if this percentage meets or exceeds the threshold, the pattern is deemed to have been hit or that the file is judged to have "too many unusual values" for this pattern. Further, the properties file defining the multiple threshold values may further include an additional threshold parameter representing the minimum number of non-empty values of that field before the thresholds get applied.

The unlikelihood of a field value belonging to a particular field or the unusualness of the field value is determined 610. Some embodiments calculate an unusualness score for each field value under one or more fields. In one instance, an unusualness score is calculated for each field value under the name field. The unusualness score of a field value can be calculated by determining a familiarity level or gibberish-like level for one or more strings in each field value. Some embodiments calculate the unusualness score of a field value by determining a familiarity level or gibberish-like level for substrings within the one or more strings in each field value. In some such embodiments, a substring may be extracted from the one or more strings and compared to a training set in order to determine a confidence level for that substring.

For instance, some embodiments may determine that the substring "ald" extracted from a field value of "raynald" would have a low unusualness score upon observing that the words "donald" or "gerald" appear frequently in the training set or have high confidence levels (i.e., have been verified or determined to be correct or valid names). In another instance, some embodiments may determine that the substring "or" extracted from "rory" would have a low unusualness score upon observing that the words "tori," "orlando," or "gloria" either appear frequently in the training set or have high confidence levels.

In some embodiments, the unusualness score for each field value is calculated by comparing each field value with a training set including a set of field values and associated confidence levels. For instance, the unusualness score a field value under a first name field may be calculated by comparing the field value with a list of first names in the database. When the one or more strings in the field value does not match with any of the first names in the database, then some embodiments may give the field value a high unusualness score. With enough field values with high unusualness scores, the file may be deemed to contain an "unusual content" pattern.

In some embodiments, a file is determined to contain an "unusual content" pattern when the average unusualness score across the field exceeds a threshold value. Some embodiments accumulate the unusualness score across the set of records in the file 615. The average may be determined by dividing the accumulated unusualness score by the number of records 620. Some embodiments then apply the average to a threshold to determine whether the average exceeds the threshold 625. In some embodiments, the file is flagged upon determination that the average exceeds the threshold value.

Figure 7A:
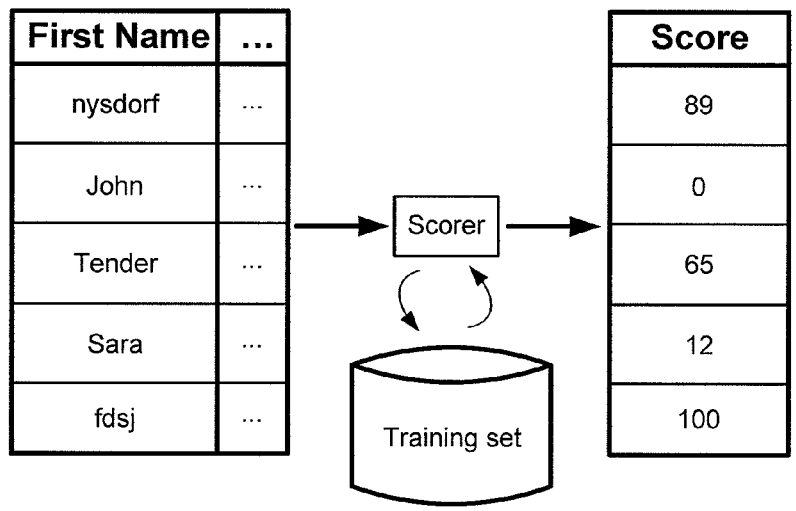
FIGS. 7(a)-7(c) illustrate examples of determining whether different sets of records contain at least one "bogus data" pattern, or more specifically, an "unusual content" pattern, in accordance with some embodiments.
Figure 7B:
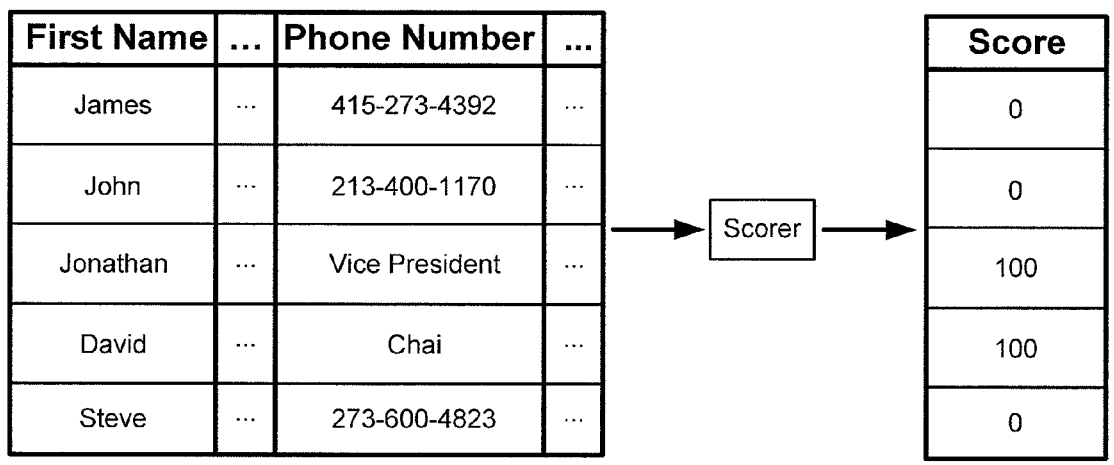
Figure 7C:
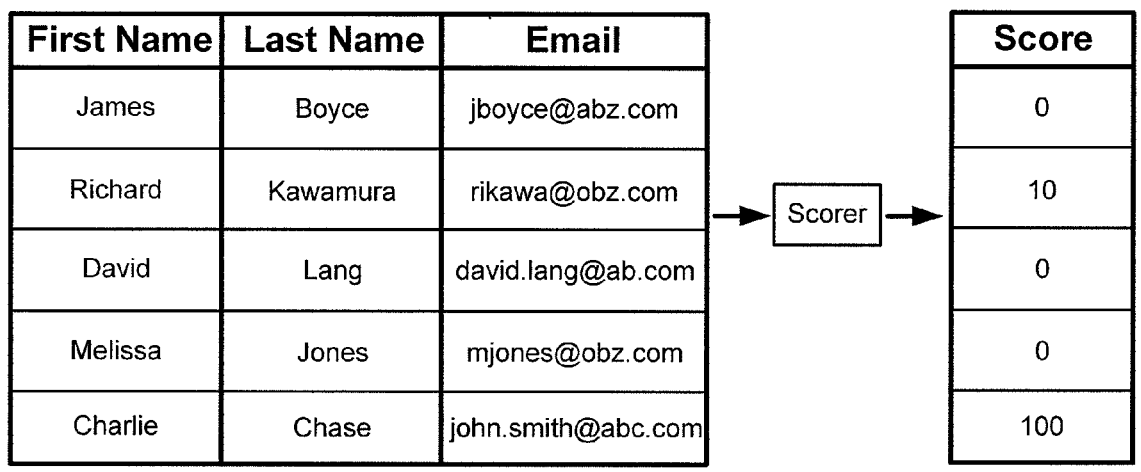

FIGS. 7(a)-7(c) illustrates examples of determining whether different sets of records contain at least one "bogus data" pattern, or more specifically, an "unusual content" pattern, in accordance with some embodiments. FIG. 7(a) illustrates an example for determining whether a set of records contains an "unusual content" pattern where the unusualness of each field value for a particular field exceeds a threshold (e.g., predetermined by a user, predetermined upon statistical inference). In some embodiments, the fraud checker determines an unusualness score for a particular field value for each of the set of records (e.g., via an unusualness scorer). Some embodiments determine the unusualness score for a field value of each of the set of records using statistical analysis of field values. U.S. patent application Ser. No. 13/008,853, filed Jan. 18, 2011, entitled, "SYSTEM AND METHOD OF MATCHING AND MERGING RECORDS," and which is hereby incorporated herein by reference, discusses various details and aspects of performing statistical analysis on data records for one or more fields. Using statistical analysis, a different threshold "unusualness" may be determined for one or more fields. A file may then be flagged as containing "usual content" pattern when the unusualness score calculated for each field exceeds its corresponding threshold value.

In some embodiments, the unusualness score of a field value for a particular field may be determined by comparing the field value with a training set including a set of values that are considered non-fraudulent data or probable field values for the particular field. The training set may further include a set of confidence values corresponding to each field value that indicates how likely the field value is something that belongs to the particular field. For instance, the string "John" for a first name field may appear in the training set for first names with a high confidence level of 100%. In this instance, a field value of "John" may be determined to have a very low unusualness score. On the other hand, if a gibberish string that does not appear in the training set or appears with a low confidence level (e.g., less than 5%), then the unusualness score may be determined to be high.

As shown in FIG. 7(a), an unusualness score is determined for the first name field of each record in the file. The scorer performs a statistical analysis on each of the first name field scores to determine the unusualness score for each of the first name field scores. As described, some embodiments determine the unusualness of each value by using a training set that includes a number of values and associated confidence score. The training set in some embodiments is created from a compilation of an enormous amount of data that is likely to be correct. For instance, the training set for first names may be a database that includes first names from all over the world. The training set may assign a higher confidence level to those first names that are encountered more frequently, such as "John" or "David," while assigning other names that appear less frequently with a lower confidence level.

In this example, the first name "nysdorf" may be determined by the training set to have a low confidence level since this string may not appear in the training set at all or may appear with a very low confidence level. The unusualness scorer may thereby assign a high unusualness score to this value. The names "John" and "Sara," however, may be assigned a higher confidence level when the unusualness scorer uses the training set to determine the unusualness scores for these field values. In this example, "John" is determined to have a low unusualness score since the name may have appeared with a high confidence level in the training set.

As described, some embodiments not only evaluate the unusualness level of each field value, but also evaluate portions of a field value. In some embodiments, portions of a field value is extracted for comparison with a training set in order to determine the unusualness value of the field value. For instance, some embodiments may determine that the substring "ken" or "kentaro" would have a low unusualness score by observing that the words "kenneth" and "kent" appear quite frequently in the training set or have high confidence levels.

While some embodiments determine the unusualness score by matching the field value with a training set containing a set of valid field values, some embodiments determine the unusualness score for a field value by performing syntactical evaluations (e.g., evaluating whether the field value is a syntactically well-formed e-mail address or not). For instance, some embodiments evaluates the unusualness score for the field values under an e-mail field by checking whether each field value contains an "@" sign and/or ends in ".com," ".edu," or ".org," etc. Such embodiments may determine that field values containing those syntax would have a low unusualness score while those without the predetermined syntax may have a high unusualness score.

Further, some embodiments determine the unusualness score by extracting a portion of the field value and then determining whether the portion indicates that the field value is a "usual" field value or likely an appropriate field value. For instance, by extracting the last word in an input string (e.g., Inc., Co., etc.) and then analyzing the extracted word enables the fraud checker to determine whether the field value is likely a company name. FIG. 7(b) evaluates the unusualness score for the field values under the phone number field by replacing every digit in the string by a single letter. This feature enables the scorer to distinguish phones and zips from other entities. Again, using large easily available training sets of zips and phones enables the scorer to pick up variability in un-normalized phones and un-normalized zips, even across countries. This enables the phones and zips to be scored accurately for unusualness without having to explicitly model the large number of different un-normalized phone and un-normalized zip formats. As shown in FIG. 7(b), the field values under the number field with digits have a low unusualness score, while the field values that have strings of letters have a high unusualness score.

While FIG. 7(b) illustrates an example for determining whether a set of records contains a particular "unusual content" pattern using field values from a single field, some embodiment enable the fraud checker to determine whether a "bogus data" pattern exists in the file by using more than a single field. FIG. 7(c) illustrates an example where multiple fields are taken into account when determining whether a multi-field "unusual content" pattern exists in the file. An multi-field unusual content pattern can be found when there is inconsistency between multiple fields (e.g., first name field and/or last name field and e-mail address field). For instance, in FIG. 7(c), a combination of first name field value, last name field value, and e-mail field values in a record are evaluated to determine whether an unusual content pattern exists in the file.

In some embodiments, a high unusualness score may be assigned to records having e-mail addresses that are inconsistent with person names beyond a threshold frequency. As shown in FIG. 7(c), the e-mail address that are consistent with the first and/or last names of the same record may be assigned a low unusualness score, while the e-mail addresses that are inconsistent or have a different syntax than those commonly found in e-mail addresses may be assigned a high unusualness score.

In some embodiments, a number of the records less than the all the records in the file are grouped by a particular category (e.g., a company) and the records within the group may then be analyzed. For instance, the fraud checker may determine whether a particular pattern exists, such as a pattern that indicates that there are too many C-level contacts (e.g., CEOs, CTOs, CIOs), among employees of a particular company. In some embodiments, the fraud checker may partition a file that contains contact records for employees of multiple companies to group the records corresponding to employees within the same company (e.g., by matching the domain extracted from the email addresses of each record). The fraud checker may then analyze the partitioned records to determine whether the particular pattern exists within each group of records in the file corresponding to a particular company.

In some embodiments, the fraud checker determines that a "bogus data" pattern exists when the number of C-level contacts for a particular company exceeds a threshold percentage of the number of people in the particular company. Some embodiments determine that a "bogus data" pattern exists when more than a threshold number of duplicate titles at the executive level within a particular company are identified.
Use-Cases, Applications, Generalizations The above framework will easily accommodate the JIGSAW® service or DATA.COM® service, both of which maintain a database of global business contacts and companies that can be described as providing electronic business cards. In an embodiment, the Jigsaw data fraud checker is a component of the Jigsaw.com bulk upload flow where a set of records is uploaded to the contacts database in a bulk file upload. The above framework provides the requisite fraud analysis prior to incorporating incoming data containing contact records with the contact database. In some embodiments, a column mapper standardizes the incoming file's columns such that the columns correspond to the Jigsaw attribute names for the various business card attributes (e.g., first_name, last_name, title, email, etc.). The fraud checker in some embodiments may then perform fraud analysis after the column mapper performs the standardization. In some embodiments, the fraud checker performs fraud analysis on any file containing contact records in a standardized form. That is, the fraud checker may analyze a set of contacts received from a user or a set of contacts from any company. While certain users have a propensity or incentive to submit bogus data, the fraud checker may serve to identify the receive files that may contain fraudulent data.

The fraud checker may determine whether any of a number of "bogus data" patterns exists in the file. As described, these patterns mostly fall into either 1) too much similar content (e.g., too many C-level titles, too many near-identical email addresses, too many duplicate person names, too many duplicate titles at the executive levels, too many C-level contacts at a specific company, too many occurrences of the same contact name with superficial differences, etc.) or 2) too many unusual values (e.g., too many seemingly gibberish person names, too many unknown titles, etc.).

The fraud checker performs fraud analysis in a way that greatly improves performance or running time. Pattern determination (e.g., ones that check for similar content) typically requires one to track certain characteristics of the entire set of records in memory, thereby requiring an order of n^2 of running time as previously mentioned. While Jigsaw may often receive files with number of records exceeding millions, the improved performance at quasi-linear time is significant. Further, patterns that score for unusualness of values in certain attributes or multi-attributes can be made to run in linear time as well. For each such pattern, the scores can be computed one by one on individual records, thus requiring just one linear pass over the entire batch of records. In some embodiments, a state is maintained for each of these patterns during the pass. This state records certain statistics that are derived from the pattern's scores on individual records and accumulated incrementally. At the end of the pass, the state has just the information needed to calculate the overall score of the pattern over the entire set of records.

Consider the pattern "too many C-level titles". The score function for this pattern, when applied to any one record with a non-empty title, returns 1 if the record's title is a C-level one and 0 if not. The associated statistic then simply incrementally counts these 0s and 1s. At the end of the pass, a statistical inference mechanism kicks in, to assess whether these counts imply that this batch has "too many C-level titles" or not.

The fraud checker checks for "similar content" patterns by performing single-pass clustering, followed by post-processing of the clusters at the end of the pass. Each similar content pattern has its own clustering data structure, which is initially empty. A cluster of a pattern P contains all records having very similar (near-identical) content for that pattern. The cluster data structure of pattern P stores a partition of the entire set of records (once the pass is done) into sets (equivalence classes) of near-identical records on pattern P. For example, if P is "near-identical or identical emails" then the cluster partition of P is a partition of the entire set of records into subsets, where all records in the same subset have a near-identical or identical email.

As the records in the file are scanned in sequence, each record is put into its appropriate pattern-specific cluster. Once the pass is complete, all the clusters are examined and pattern scores derived from them. These pattern scores lead to final conclusions such as "too many near-identical email addresses" or "too many near-identical person names," etc.

The main benefit of this approach is a massive speedup over an n^2 clustering algorithm for large files. A secondary benefit is that a single outer loop, which executes a single pass through the entire file, is used for all types of patterns. The differences come in what data structures are produced for different types of patterns, and how they are consumed once the pass is done. In some embodiments, "similar content" patterns use clustering data structures while "unusual content" patterns use unusualness-accumulating data structures. This unification improves the extensibility of the algorithm and maintainability of the code.

The above description of the outer-loop level of the algorithm may be summarized into the following pseudo-code

```
# Initialize fraud pattern data structures
Initialize 'similar content' clustering data structures
Initialize 'unusual content' scores-accumulation data structures
Initialize 'other pattern' data structures
# Do the pass over the file and incrementally update these data
structures
For each record r in file
    For each similar content pattern P
        Add r to appropriate cluster of pattern P
    For each unusual content pattern P
        Update accumulated scores of pattern P
    For each 'other' pattern
        Update this 'other' pattern's data structure
End
# Analyze these data structures to judge which patterns, if any, occur
in the file
Analyze the clusters to find those 'similar content' patterns, if any,
that have occurred in the file with sufficient severity.
Analyze the accumulated unusualness scores to find those 'unusual
content' patterns, if any, that are deemed to have occurred with
sufficient severity.
```

As described, "bogus data" pattern includes "similar content" patterns and "unusual content" patterns. Single-field similar content patterns include patterns such as 'email dupes', 'title dupes', etc. As mentioned, the fields to check for and the (field-specific) thresholds to use to assess whether the similar content is 'too much' or not are read from a properties file. In some embodiments, the threshold includes two parameters for each field: (i) the original threshold and (ii) the minimum number of non-empty values of that field before the original threshold is applied. The field names to check for (which can be any column name in the input file) and the thresholds to use are thus easily modifiable. Field-specific thresholds are permitted because different fields have differing minimum degrees of similar content beyond which the data is unusual. For example, email dupes in a single file can be explained by either unintentional record-level dupes or fraud while title dupes on the other hand, especially for staff and manager-level titles, can be explained by the fact that many people can have the same title.

The key data structure used for single-field similar content pattern detection is a HashMap called pattern_dupes_histogram. In ruby notation:

pattern_dupes_histogram["dupes-#{field_name}"]
[value]=|{r|r is a record in the file and normalized(r.field_name) equals value and value is not nil}| (1)

For example, pattern_dupes histogram["dupes-email"] ["jdoe@xyz.com"] is the number of records in the file whose normalized email is "jdoe@xyz.com." In some embodiments, emails are normalized by stripping digits from their prefixes because putting emails in a file which differ only in digits is a common fraud pattern, e.g. jdoe1@xyz.com, jdoe2@xyz.com, etc. This pattern is also commonly found in fraud associated with person names.

pattern_dupes_histogram[p] is a histogram of (normalized_value,count) pairs of the distinct normalized values, and their repetition counts, for pattern p over all the records in the file. Once the histograms have been fully computed (i.e., the pass over the file is complete), the results are analyzed. The amount of duplication of a pattern p is quantified from pattern-dupes-histogram[p] by letting n denote the number of keys in pattern-dupes-histogram[p] (i.e., the number of distinct normalized values of p) and by letting m denote the total number of occurrences of these values in the file (i.e., the summed count over all (normalized) values in the histogram). Then $$\text{dupes-score}(p) = (m-n)*100.0/m \quad (2)$$

for m>0 and 0 when m=0, where the multiplier 100.0 makes this interpretable as a percentage.

To illustrate dupes-score on a dupes-title pattern, suppose the file contains 1000 titles, each distinct title occurring twice. Then m=1000, n=500, and dupes-score=50%. Alternatively, suppose all the titles are identical, the dupes-score is 99.9%. The post-pass analysis runs over all the dupes histograms, computes their dupe-scores, and flags those dupes patterns whose dupes-scores meet or exceed the pattern threshold and whose set of non-empty values is sufficiently large.

Some embodiments may determine whether a "similar content" pattern exists in the file by identifying a multi-field pattern. A similar content multi-field pattern requires the fraud checker to check for the similarity of the combination of first name and last_name across the records in the file when the fraud checker is attempting to quantify the similarity of person names in the input file. The data structure patterns_dupes_histogram [p] [value] can be used to keep track of hits to similar content multi-field patterns. The pattern is p (e.g., "similar person names") and the fields it is composed of (e.g., [first name, last_name]) may be an ordered collection (the order is used in normalized below). A generic multi-field method normalized has the form normalized(p,record). normalized(p,record) returns nil if at least one of the fields of p have a nil value in record. When this is not the case, normalized(p,record) returns a concatenation of the normalized values of p's fields in the record.

In this example, the 'similar person names' pattern is used and the records along with their normalized person name values are shown in the table below. In this example, only the two fields that influence the normalized value are shown in each record. Empty cells denote 'nil' values.

| first_name | last_name | normalized value |
|---|---|---|
| John | | |
| John | Doe | johndoe |
| John | Doe2 | johndoe |

The analog of (1) for multi-field similar content patterns p is pattern_dupes_histogram [p] [value]=|{r|r is a record in the file and normalized(p,r) equals value and value is not nil}| (3)

Thus, for the 'similar person names' pattern, pattern_dupes_histogram [p] is simply a histogram over all normalized person names in records in which a full person name (i.e., non-empty first_name and non-empty last_name) appears. Multi-field similar content patterns have their own parameters (dupes threshold and minimum number of non-empty values). The dupes-score formula, (2), is unchanged.

In some embodiments, the fraud checker checks for "unusual content" patterns for a single field using thresholds taken from a properties file, as described above. In addition to the dupes threshold mentioned above, an additional parameter c is included that represents the minimum number of non-empty values of that field before the thresholds gets applied. The fields in the properties file must be a subset of the fields that can be scored for unusualness. Each pattern has two thresholds a and b where a is a threshold on the unusualness score of an individual value and b is a threshold on the percentage of values for this pattern in the file that are significantly unusual. If a value's unusualness score meets or exceeds threshold a, that value is judged to be significantly unusual. As an example, one would expect 'asxyrb' to be judged a significantly unusual value for the first name of a person. If this percentage meets or exceeds b, the pattern is deemed to have been hit, i.e. the file is judged to have "too many unusual values" for this pattern.

In some embodiments, particular data structures are used to accumulate the statistics of hits to all these patterns, over all the records in the file. For notational convenience, let f denote a field name and p=unusual-content-#{f} the corresponding pattern. Let p.unusualness_score(value) denote the unusualness score of value 'value'.

num_hits_to_patterns[p]=|{r|r is a record in the file, r.f is non-empty, and p.unusualness_score(r.f) >=a}| (4)

num_hits_to_patterns[p] is thus simply the number of values of field f in the file whose unusualness score meets or exceeds the threshold a for this pattern. num_hits_to_patterns_normalizer[p] is just the number of records in the file having a non-empty value for r.f. The post-pass analysis phase now simply checks, for each single-field unusual content pattern p, whether num_hits_to_patterns_normalizer[p]>=c, and num_hits_to_patterns[p].to_f/num_hits_to_patterns_normalizer[p]>=b where c is the minimum number of non-empty values needed for this field before the threshold gets triggered and b the percentage threshold of this field's pattern. The patterns for which this is the case are output, along with their 'percent hit' scores. An alternative to counting and using the number of hits to an unusual content pattern is to simply accumulate all the unusualness scores, take their average, and apply a suitable threshold to determine whether the average is high enough to warrant an alert or not. This approach can pick up subtler cases of bad data, where a lot of data scores moderately high for being unusual but not enough individual cases score so high so as to trigger the count-based alert. A small advantage of this approach is also that it uses a single threshold whereas the count-based approach used two thresholds. The formal version of this alternative is below.

patterns_scores[p]=sum of p.unusualness_score(r,f)
over records r in a file in which r.f is non-empty In the post-pass analysis, the following is performed:

average_pattern_score[p]=patterns_scores[p]/num_hits_to_patterns_normalizer[p]average_pattern_score[p]>=t In some embodiments, an "unusual content" pattern may be identified by performing unusual content scoring. For instance, person first and last names are scored for being unusual using the trigram or bigram Markov models that the PUZZLEMASTER™ merge algorithm uses for scoring the same fields [1]. There may be two separate models for first_name and for last_name.

As mentioned, email is scored via a regex parser—either the text is a syntactically well-formed email or not. The rest of the fields—phone, title, company name, city, state, zip—are scored using a special Bayes classifier working together with a non-trivial feature extractor that feeds appropriate features to the classifier. These features are fed the same way during training, and during classification.

In some embodiments, features that have high ability to discriminate among the various entities are used. For example, one of the features is the identity of the last word in the input string. This feature accurately discriminates company names from person names and from some other entities. It is not as good at discriminating company names from titles (e.g. a title or a company name can end with the word Systems). Other features, notably certain keywords or phrases (vice president, . . . ) reliably distinguish titles from company names. Another example of a feature is 'replacing every digit in the string' by d. For example, +1-650-352-4112 would get replaced by +d-ddd-ddd-dddd. This feature reliably helps distinguish phones and zips from other entities. Using large easily available training sets of zips and phones and using this simple feature automatically picks up a lot of variability in un-normalized phones and un-normalized zips, even across different countries. This enables one to score phones and zips accurately for (un)usualness without having to explicitly model the large number of different un-normalized phone and un-normalized zip formats.

Some embodiments may determine whether an "unusual content" pattern exists in the file by identifying a multi-field pattern. For instance, an "unusual content" pattern may be detected by checking for inconsistency between person name and email address as described above. This involves checking the combination of first_name, last_name, and email in a record. Let p denote a multi-field unusual content pattern. Let p.is_complete(r) return true if and only if all the fields that p is composed of have non-empty values in r. For example, for p="inconsistency between person name and email address", p.is_complete(r) is true if and only if all of r.first_name, r.last_name, and r.email are non-empty.

Let p.unusualness_score(r) return an unusualness score for pattern p on the data in record r. It is assumed that p.is_complete(r) is true. For example, for p="inconsistency between person name and email address", p.unusualness_score(r) would be high if the person name (r.first_name,r.last_name) was inconsistent with the email address r.email. A person-name-email-prefix matcher may be used to score the consistency of a person name to an email prefix. The multi-field versions of the data structures are then num_hits_to_patterns[p]=|{r|r is a record in the file, p.is_complete(r) is true, and p.unusualness_score (r)>=a}| (5)

num_hits_to_patterns_normalizer[p]=|{r|r is a record in the file and p.is_complete(r) is true}| (6)

The fraud checker then determines whether (6) is sufficiently large and if so divide (5) by (6) and apply p's percent threshold. As with single-field unusual content patterns, multi-field pattern scoring can be done differently, specifically by accumulating all the unusualness scores of tests against this pattern and using their average. The benefits are the same as discussed in the earlier section. In detail this is, patterns_scores[p]=sum of p.unusualness_score(r)
over records r in a file in which p.is_complete(r) is true In the post-pass analysis, the fraud checker performs:

average_pattern_score[p]=patterns_scores[p]/num_hits_to_patterns_normalizer[p]average_pattern_score[p]>=t Further, consider the pattern p="Too many C-level titles" where a new field is_C_level has been appended to each record. This field's value is defined only when the record has a non-empty title, in which case it is true if the title is a C-level title and false if not. Similar to multi-field patterns, p.is_complete(r) may be defined to return true if and only if r.title is non-empty. Also, for an r for which p.is_complete(r) is true, p.unusualness_score(r) may be defined as 1 if r's title is a C-level title and 0 if not. As described, a rank classifier algorithm determines whether a title is a C-level one or not. In this case, one would use (5) with a=1 and (6) unchanged, and the values of b and c specified from the outside (as with other unusual content patterns). Therefore, to accommodate any derived-field unusual content pattern p, one would need to define (i) p.is_complete(r) and (ii) p.unusualness_score(r).

Group by patterns are applied to each set of records in a partition of the full set of records. The partition is defined by the value of a certain attribute. One instance of using group by pattern is when determining whether there are any companies in a set of contact records having "too many C-level records in it". Some embodiments may identify a record's company by the domain of the email. For each group by pattern, a two-dimensional hash map or a contingency table is used to accumulate counts of hits to the pattern. These hits are accumulated in the usual one pass over the entire set of records.

Let p denote such a pattern. p is characterized by the group by attribute, denote it g, and by the attribute to be scored for unusualness within each group, denote it s. In this example, g is the derived field email_domain (domain of a record's email) and s is the already familiar derived field is_C_level_title. Define p.is_complete(r) as true if and only if both r.g and r.s have non-empty values. Then this hash map is num_hits_to_patterns[p][a][b]=|{r|r is a record in the file, p.is_complete(r) is true, r.g=a, r.s=b}|| (7)

In some embodiments, instead of limiting r.s=b in (7), some embodiments generalize (7) to use p.unusualness_score (r)>=b. In the former, b is a value; in the latter, b is a threshold. Setting a limitation may simply the analysis while serving its purpose. Specifically, in one example, s is_C_level_title, which has just two values: 'true' or 'false'. The value 'true' is deemed unusual. From the counts of the 'true' or 'false' values, one can infer whether an overly high proportion of is_C_level_title values are true or not.

The post-pass analysis now examines this data structure of (7) and derives appropriate inferences from it. A statistical inference procedure is used. The need for this sophistication is illustrated by the example below. Suppose one is interested in scanning an entire, large database of contacts, spread across lots of companies, for the pattern "too many C-level contacts at any one company". The Jigsaw contacts database, as of July 2011, has more than 27 million contacts spread across a few million companies. One may assume that fraudulent data of the type detectable by this pattern is present in the database but is not wide-spread. Most companies bigger than a certain minimum size will have a not very high C-level contact percentage. Relative to the norm, some that do will stand out, and a much higher density of fraud in this group relative to the norm group is expected.

As for the qualifier "certain minimum size," very small companies (e.g., with 1 to 5 contacts), can have a very high proportion of C-level contacts even in non-fraudulent data. For example, there may be a one-man company and this contact's title may be Owner, a C-level title. This observation suggests that company size awareness in performing statistical inference for this pattern is important. Rather than applying this specific rule (treat companies with 1-5 employees differently than larger companies), statistical inferences on company size bins is relied upon. Specifically, for each size range in a pre-specified set of company size ranges, the mean and standard deviation of the proportion of C-level contacts in a company are computed, over the companies in that size range. Then in each size range, companies (if any) that are outliers, i.e. whose proportion of C-level contacts is much higher than the mean plus standard deviation of the size range are identified. This procedure is completely data driven (apart from the choice of size ranges) and makes it more accurate than one based on explicit pre-designed rules. It can also uncover structure that may be in the data that is germane to this fraud pattern that one may not even be aware of.

Rather than use an email domain to identify a company, the example below will use an explicit company identifier. Such an identifier is indeed available for the database of Jigsaw contacts. A domain is a good proxy when no identifier is available, such as when a batch of records is coming from the outside. However when the database is large and varied and such an identifier is available, it is a better choice. Companies can have multiple domains. With this change, the keys to num_hits_to_patterns[p], where p is the "too many C-level contacts in a specific company" pattern, are all distinct company identifiers in our data set. Denote this set C.

Some embodiments compute the following for every c in C, $$f[c] = \frac{\text{num\_hits\_to\_patterns}[p][c] \text{ [true]}}{\left(\begin{array}{c}\text{num\_hits\_to\_patterns}[p][c] \text{ [true] } + \\ \text{num\_hits\_to\_patterns}[p][c] \text{ [false]}\end{array}\right)} \quad (8)$$

f[c] is simply the proportion of C-level contacts in company c, as measured from the data set.

Let R denote a partition of the set of nonnegative integers into a set of at least two ranges. For example, R={1 ... 5, 6 . . . }, where 6 ... means>=6. R induces a partition of C by company size. Denote this partition C_R. To compute this partition, one needs to quantify the size of each company. Some embodiments use the counts for this purpose as well, specifically, for company c $$\text{size}[c] \sim (\text{num\_hits\_to\_patterns}[p][c][\text{true}] + \text{num\_hits\_to\_patterns}[p][c]\text{false}]) \quad (9)$$

where ~ denotes that this is the estimate.

Once the partition C_R is computed, the mean m(S) and standard deviation sd(S) of f[c] for each set S in C_R over all the c in S is computed. The c in S is then sorted in order of non-increasing f[c], and those c as suspicious whose f[c]>m(S)+2*sd(S) are flagged and returned in the sorted order of f[c].

In the instance where one wishes to screen for this pattern in a (large) input file instead of an entire database of contacts across many companies, some embodiments may compute (7) and (8) similar to previously described. In some embodiments, the size of the company can be computed by looking up the email domain in the full database of contacts. If the email domain is not found, then the number of records in the input file having this domain as the email domain can be used as a lower bound on the company size. Some embodiments then use the means and standard deviations of (8) in the various company size bins as those computed over the entire database of contacts. If that database is not available, the means and standard deviations can be computed from the data in the input file itself, similar to that performed when screening the entire database of contacts for this pattern.

The generalized form of (7) is $$\text{num\_hits\_to\_patterns}[p][a]=|\{r|r \text{ is a record in the file, p.is\_complete(r) is true, r.g=a, p.unusualness\_score(r)>=b}\}| \quad (10)$$

This is similar to (5), except that it tracks number of hits to the unusual content pattern p for all different values of the group by attribute g.

There is also a summed unusualness scores variant of (10):

$$\text{pattern\_scores}[p][a]=\text{sum of p.unusualness\_score(r) over records r in a file in which p.is\_complete(r) is true and r.g=a} \quad (11)$$

For (10), a minimally-modified version of (6) also works:

$$f[c]=\text{num\_hits\_to\_patterns}[p][c]/\text{num\_hits\_to\_patterns\_normalizer}[p][c] \quad (12)$$

where f[c] is simply the proportion of records in group c having unusual content. For (11), $$f[c]=\text{pattern\_scores}[p][c]/\text{num\_hits\_to\_patterns\_normalizer}[p][c] \quad (13)$$

Regardless of whether f[c] is computed according to (8), (12), or (13), the remainder of the analysis is the same, as described earlier.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" may be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Moreover, unless specifically stated otherwise, the terms "first," "second," "third," and the like do not necessarily imply an order or sequence. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

It may be understood that any of the embodiments of the present invention can be implemented in the form of control logic using hardware and/or using computer software in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g., a hard drive or an entire computer system), and may be present on or within different computer program products within a system or network. A computer system may include a monitor, printer, or other suitable display for providing any of the results mentioned herein to a user.

Any of the methods described herein may be totally or partially performed with a computer system including a processor, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of identifying fraudulent data in a contact database, the method comprising:
    receiving a plurality of contact records, each of the plurality of contact records including a set of contact field values corresponding to a set of contact fields;
    determining, by a computing device, whether a similar content pattern exists in the plurality of contact records using at least one of the set of contact field values, wherein determining whether the similar content pattern exists in the plurality of contact records comprises:
    receiving a threshold value for the similar content pattern;
    calculating a dupes-score for at least one of the set of contact fields, the dupes-score indicating an amount of content duplication in the at least one of the set of contact fields; and
    determining that the similar content pattern exists when the dupes-score exceeds the threshold value for the similar content pattern; and
    flagging, by the computing device, the plurality of contact records when the similar content pattern is determined to exist in the plurality of contact records to verify whether the flagged contact records contain fraudulent data.

2. The method of claim 1, wherein calculating the dupes-score for at least one of the set of contact fields includes using one or more corresponding contact field values from a subset of the plurality of contact records.

3. The method of claim 1, further comprising:
    determining, by the computing device, whether an unusual content pattern exists in the plurality of contact records using at least one of the set of contact field values, wherein determining whether the unusual content pattern exists in the plurality of contact records comprises:
    receiving a threshold value for the unusual content pattern associated with a particular contact field;
    calculating an unusualness score for each of the plurality of contact records, the unusualness score indicating how unlikely a contact field value corresponding to the particular contact field belonged to the particular contact field;
    determining an overall unusualness score for the unusual content pattern by averaging the calculated unusualness score for the plurality of contact records;
    determining that the unusual content pattern exists when the overall unusualness score exceeds the threshold value for the unusual content pattern; and
    flagging, by the computing device, the plurality of contact records when the unusual content pattern is determined to exist in the plurality of contact records to verify whether the flagged contact records contain fraudulent data.

4. The method of claim 3, wherein the unusualness score for a contact record is calculated by comparing the contact field value with a training set that includes a set of values and an associated confidence level such that the unusualness score of the contact field value can be determined by using the associated confidence level.

5. The method of claim 1, wherein at least one of the set of contact fields includes at least one of a first name field, a last name field, a title field or an e-mail address field, wherein determining whether the similar content pattern exists in the plurality of contact records comprises determining whether near-identical contact field values appear in the plurality of contact records beyond a threshold frequency.

6. The method of claim 1, wherein at least one of the set of contact fields includes at least one of a first name field, a last name field, or a title field, wherein determining whether the unusual content pattern exists in the plurality of contact records comprises determining whether seemingly unlikely contact field values appear in corresponding contact fields beyond a threshold frequency.

7. The method of claim 1, wherein at least one of the set of contact fields includes an e-mail field, wherein determining whether the unusual content pattern exists in the plurality of contact records comprises determining whether an e-mail field value for each of the plurality of contact records is syntactically well-formed.

8. The method of claim 1, wherein the plurality of records is provided to an administrator to verify whether the plurality of records contains fraudulent data upon the plurality of records being flagged.

9. A non-transitory computer-readable medium containing program code executable by a processor in a computer to identify fraudulent data for a database system having a corpus of contact information stored therein, the program code including instructions to:
   receive a plurality of contact records, each of the plurality of contact records including a set of contact field values corresponding to a set of contact fields;
   determine whether a similar content pattern exists in the plurality of contact records using at least one of the set of contact field values, wherein the instruction to determine whether the similar content pattern exists in the plurality of contact records further includes a set of instructions to: receive a threshold value for the similar content pattern;
   calculate a dupes-score for at least one of the set of contact fields, the dupes-score indicating an amount of content duplication in the at least one of the set of contact fields; and
   determine that the similar content pattern exists when the dupes-score exceeds the threshold value for the similar content pattern; and
   identify the plurality of contact records when the similar content pattern is determined to exist in the plurality of contact records to verify whether the identified contact records contain fraudulent data.

10. The non-transitory computer-readable medium of claim 9, wherein the instruction to calculate the dupes-score for at least one of the set of contact fields includes using one or more corresponding contact field values from a subset of the plurality of contact records.

11. The non-transitory computer-readable medium of claim 9, further comprising an instruction to determine whether an unusual content pattern exists in the plurality of contact records using at least one of the set of contact field values, wherein the instruction to determine whether the unusual content pattern exists in the plurality of contact records comprises further includes a set of instructions to:
   receive a threshold value for the unusual content pattern associated with a particular contact field;
   calculate an unusualness score for each of the plurality of contact records, the unusualness score indicating how unlikely a contact field value corresponding to the particular contact field belonged to the particular contact field;
   determine an overall unusualness score for the unusual content pattern by averaging the calculated unusualness score for the plurality of contact records;
   determine that the unusual content pattern exists when the overall unusualness score exceeds the threshold value for the unusual content pattern; and
   identify the plurality of contact records when the unusual content pattern is determined to exist in the plurality of contact records to verify whether the identified contact records contain fraudulent data.

12. The non-transitory computer-readable medium of claim 11, wherein the unusualness score for a contact record is calculated by comparing the contact field value with a training set that includes a set of values and an associated confidence level such that the unusualness score of the contact field value can be determined by using the associated confidence level.

13. A system for identifying fraudulent data in a contact database having a corpus of contact information stored therein, the system comprising:
   a processor;
   a network interface; and
   a memory encoded with program code to be executed by the processor, comprising:
   program code to receive a plurality of contact records, each of the plurality of contact records including a set of contact field values corresponding to a set of contact fields;
   program code to determine whether a similar content pattern exists in the plurality of contact records using at least one of the set of contact field values, wherein the program code to determine whether the similar content pattern exists in the plurality of contact records further includes program code to: receive a threshold value for the similar content pattern,
   calculate a dupes-score for at least one of the set of contact fields, the dupes-score indicating an amount of content duplication in the at least one of the set of contact fields, and
   determine that the similar content pattern exists when the dupes-score exceeds the threshold value for the similar content pattern; and
   program code to identify the plurality of contact records when at least one of the similar content pattern or the unusual content pattern is determined to exist in the plurality of contact records to verify whether the identified contact records contain fraudulent data.

14. The system of claim 13, wherein the program code to calculate the dupes-score for at least one of the set of contact fields includes using one or more corresponding contact field values from a subset of the plurality of contact records.

15. The system of claim 13, further comprising program code to determine whether an unusual content pattern exists in the plurality of contact records using at least one of the set of contact field values, wherein the program code to determine whether the unusual content pattern exists in the plurality of contact records comprises:
   program code to receive a threshold value for the unusual content pattern associated with a particular contact field;
   program code to calculate an unusualness score for each of the plurality of contact records, the unusualness score indicating how unlikely a contact field value corresponding to the particular contact field belonged to the particular contact field;

program code to determine an overall unusualness score for the unusual content pattern by averaging the calculated unusualness score for the plurality of contact records;

program code to determine that the unusual content pattern exists when the overall unusualness score exceeds the threshold value for the unusual content pattern; and program code to identify the plurality of contact records when the unusual content pattern is determined to exist in the plurality of contact records to verify whether the identified contact records contain fraudulent data.

16. The system of claim 15, wherein the unusualness score for a contact record is calculated by comparing the contact field value with a training set that includes a set of values and an associated confidence level such that the unusualness score of the contact field value can be determined by using the associated confidence level.

17. The method of claim 13, wherein at least one of the set of contact fields includes at least one of a first name field, a last name field, a title field or an e-mail address field, wherein determining whether the similar content pattern exists in the plurality of contact records comprises determining whether near-identical contact field values appear in the plurality of contact records beyond a threshold frequency.

* * * * *